United States Patent [19]

Lambert

[11] Patent Number: 5,338,527

[45] Date of Patent: Aug. 16, 1994

[54] ZIRCONIUM SILICATE COMPOSITION, METHOD OF PREPARATION AND USES THEREOF

[75] Inventor: Susan L. Lambert, Rolling Meadows, Ill.

[73] Assignee: UOP, Des Plaines, Ill.

[21] Appl. No.: 932,538

[22] Filed: Aug. 20, 1992

[51] Int. Cl.$^5$ ............................................. C01B 33/32
[52] U.S. Cl. ................... 423/332; 423/326; 423/718; 502/64
[58] Field of Search ............... 423/718, 713, 326, 332; 502/64

[56] References Cited

U.S. PATENT DOCUMENTS

| | | | |
|---|---|---|---|
| 2,991,151 | 7/1961 | Breck et al. | 423/718 |
| 3,329,480 | 7/1967 | Young | 502/64 |
| 4,310,440 | 1/1982 | Wilson et al. | 252/435 |
| 4,422,959 | 12/1983 | Lawson et al. | 502/247 |
| 4,440,871 | 4/1984 | Lok et al. | 502/214 |
| 4,564,511 | 1/1986 | Desmond et al. | 423/713 |
| 4,705,675 | 11/1987 | Desmond et al. | 423/713 |
| 5,108,579 | 4/1992 | Casci . | |

*Primary Examiner*—Anthony McFarlane
*Attorney, Agent, or Firm*—Thomas K. McBride; Eugene I. Snyder; Frank S. Molinaro

[57] ABSTRACT

This invention relates to a novel zirconium silicate compound which has the formula $M_xSi_yZr_zO_w$ where M is an ammonium ion, a hydronium ion, an alkali metal or mixtures thereof and x, y, z and w are the mole fractions of M, silicon, zirconium and oxygen respectively. The composition is characterized in that it has a unique x-ray powder diffraction pattern, has a surface area from about 80 to about 400 and has a layered structure. These compositions are prepared by hydrothermal crystallization of a reaction mixture containing reactive sources of the alkali metal, silicon, zirconium and water. Finally, these compositions may be used in various hydrocarbon conversion processes.

12 Claims, No Drawings

ZIRCONIUM SILICATE COMPOSITION, METHOD OF PREPARATION AND USES THEREOF

FIELD OF THE INVENTION

This invention relates to a novel zirconium silicate composition (ZRSI-1) of matter, a method for preparing the composition and processes for using the composition. This novel composition has the formula $M_xSi_yZr_zO_w$ where M is at least one alkali metal. Further, this material has a surface area of about 80 to about 400 m²/g and cation exchange capacity, therefore allowing metals to be dispersed on it.

BACKGROUND OF THE INVENTION

Zirconia is a well-known material which can be used as a support for catalytic metals and can be combined with other inorganic oxides to either act as a catalyst or as a support. For example, zirconia can be mixed with silica to give a zirconia/silica support which is then used to support metals for various catalytic reactions. It would be desirable to synthesize a zirconia-containing material that has high surface area and high acidity for use as a catalyst. It is also important that such a material have a stable surface area, i.e., after calcination at high temperatures.

Applicant has synthesized a zirconium silicate, identified as ZRSI-1, material which has the formula $M_xSi_yZr_zO_w$, where M is an ammonium ion, a hydronium ion, an alkali metal or mixtures thereof and x, y, z, and w represent the moles of the respective elements. This composition is characterized in that it has a high surface area on the order of 80 to 400 m²/g, has an x-ray diffraction pattern which is different from that of zirconia or silica, and has a layered structure. Finally, the alkali metal present in the composition can be exchanged with ammonium ions and then calcined to give the hydronium form of the zirconium silicate, thereby providing acid sites on the material. This material has been found to be useful as a hydrocarbon conversion catalyst.

SUMMARY OF THE INVENTION

As stated the present invention relates to a composition, a process for preparing the composition and processes using the composition. Accordingly, one embodiment of the invention is a composition (ZRSI-1) of matter having the formula $$M_xSi_yZr_zO_w$$

where M is an ammonium ion, a hydronium ion, an alkali metal or mixtures thereof, x is the moles of M and varies from about 1 to about 5, y is the moles of silicon and varies from about 2 to about 5, z is the moles of zirconium and varies from about 4 to about 6 and w is the moles of oxygen and varies from about 17 to about 25 said composition having a characteristic x-ray powder diffraction pattern which contains at least the d-spacings set forth in Table A:

TABLE A

| d (Å) | Relative Intensity |
|---|---|
| 11.7 | VS |
| 4.12 | W |
| 3.69 | M |
| 3.16 | M |
| 2.96 | S |
| 2.75 | W |
| 2.25 | M |
| 2.05 | W |
| 1.84 | M |
| 1.57 | W |
| 1.53 | M. |

Another embodiment of the invention is a process for preparing the zirconium silicate composition described above. This process comprises reacting a mixture containing reactive sources of zirconium, silicon and M at reaction conditions to form said composition, the mixture having a composition expressed in terms of mole ratios of oxides:

$$rM_2O:ZrO_2:tSiO_2:uH_2O$$

where r ranges from about 0.8 to about 1, t ranges from about 1 to about 10 and u ranges from about 30 to about 300.

Yet another embodiment of the invention is a hydrocarbon conversion process comprising contacting a hydrocarbon stream under hydrocarbon conversion conditions with a catalyst to give a hydroconverted product, the catalyst comprising a zirconium silicate (ZRSI-1) having the formula $$M_xSi_yZr_zO_w$$

where M is an ammonium ion, a hydronium ion, an alkali metal or mixtures thereof, x is the moles of M and varies from about 1 to about 5, y is the moles of silicon and varies from about 2 to about 5, z is the moles of zirconium and varies from about 4 to about 6 and w is the moles of oxygen and varies from about 17 to about 25 said composition having a characteristic x-ray powder diffraction pattern which contains at least the d-spacings set forth in Table A:

TABLE A

| d (Å) | Relative Intensity |
|---|---|
| 11.7 | VS |
| 4.12 | W |
| 3.69 | M |
| 3.16 | M |
| 2.96 | S |
| 2.75 | W |
| 2.25 | M |
| 2.05 | W |
| 1.84 | M |
| 1.57 | W |
| 1.53 | M. |

Other objects and embodiments will become more apparent after a more detailed description of the invention.

DETAILED DESCRIPTION OF THE INVENTION

As stated this invention relates to a composition (ZRSI-1), a process for preparing the composition and processes using the composition. The composition of this invention is represented by the formula $M_xSi_yZr_zO_w$ where M is an ammonium ion, a hydronium ion, an alkali metal or mixtures thereof, and x, y, z and w are the moles of M, silicon, zirconium and oxygen respectively. The present zirconium silicate compositions are prepared by hydrothermal crystallization of a reaction mixture prepared by combining a reactive source of zirconium, silicon, at least one alkali metal and water. Any zirconium compound which can be hydrolyzed to zirconium oxide or zirconium hydroxide can be used. Specific examples of these compounds include zirconium alkoxides, e.g., zirconium n-propoxide, zirconium hydroxide, and zirconium oxychloride. The sources of silicon include colloidal silica, fumed silica and sodium silicate. Finally, since the process requires a strong base, it is necessary to use the hydroxide salt of the desired alkali metal. The alkali metals which can be used include sodium, potassium, lithium, cesium and mixtures thereof.

Generally, the hydrothermal process used to prepare the zirconium silicate compositions of this invention involves forming a reaction mixture which in terms of molar ratios of the oxides is expressed by the formula: $rM_2O:ZrO_2:tSiO_2:uH_2O$, where r ranges from about 0.8 to about 5, t ranges from about 1 to about 10 and u ranges from about 30 to about 300. A reaction mixture is prepared by mixing the desired sources of zirconium and silicon together and forming a slurry to which is added the alkali metal hydroxide. One function of the alkali metal hydroxide is to adjust the pH of the mixture to a value greater than about 12. A pH of 12 or greater is required to give the crystalline zirconium silicate composition (ZRSI-1.

Having formed the reaction mixture it is next reacted at a temperature of about 130° about 300° C. for a period of about 10 hours to about 14 days. The reaction vessel is sealed and the reaction run at autogenous pressure.

The zirconium silicate compositions which result from the hydrothermal synthesis of the above-described reaction mixture have the formula $M_xSi_yZr_zO_w$ where M is at least one alkali metal, x is the moles of M and varies from about 1 to about 5, y is the moles of silicon and varies from about 2 to about 5, z is the moles of zirconium and varies from about 4 to about 6 and w is the moles of oxygen and varies from about 17 to about 25. These compositions have been given the arbitrary designation ZRSI-1 and are characterized by a unique x-ray diffraction pattern which is different from any known silicon or zirconium phase. Indeed, the x-ray diffraction pattern resembles that of a layered material due to the breadth of the lines. This x-ray diffraction pattern is characterized in that it contains at least the d-spacings set forth in Table A.

TABLE A

| d (Å) | Relative Intensity |
|---|---|
| 11.7 | VS |
| 4.12 | W |
| 3.69 | M |
| 3.16 | M |
| 2.96 | S |
| 2.75 | W |
| 2.25 | M |
| 2.05 | W |
| 1.84 | M |
| 1.57 | W |
| 1.53 | M. |

The zirconium silicate compositions of this invention are also characterized in that they have a surface area of about 80 to about 400 m²/g. Additionally, these materials appear to be layered materials as shown by the presence of a low angle peak at a d-spacing in the range of 11–16 Å and preferably in the range of 11–13 Å. The variation in the surface area with crystallinity for these materials is also consistent with a layered structure.

The zirconium silicate materials of this invention find application as hydrocarbon conversion catalysts either as is or after dispersion of catalytic metals thereon. Hydrocarbon conversion processes are well known in the art and include cracking, hydrocracking, alkylation of both aromatics and isoparaffins, isomerization, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are well known in the art. For example, U.S. Pat. Nos. 4,310,440 and 4,440,871 disclose the conditions for the above-named processes and are incorporated by reference. Of the processes enumerated above, the zirconium silicate materials are particularly suited for reforming, dehydrocyclization and isomerization.

Reforming conditions typically include a temperature in the range of 700° to 1000° F. (371°–538° C.) Hydrogen pressures are in the range of 100 to about 500 psig (689 to 3,445 kPag). Contact times usually correspond to liquid hourly space velocities (LHSV) in the range of about 0.1 hr$^{-1}$ to 10 hr$^{-1}$. Hydrogen to hydrocarbon molar ratios in the range of 1 to 20, preferably between 4 and 12.

Dehydrocyclization reactions employing paraffinic hydrocarbon feedstocks, preferably normal paraffins having more than 6 carbon atoms, to form benzene, xylenes, toluene and the like are carried out at temperatures of about 850° to 1100° F. (454 to 593), a pressure of 0 to 50 psig (0 to 345 kPag) and a LHSV of 0.5 to 10 hr$^{-1}$. For these reactions it is preferred to disperse a Group VIII non-noble metal such as cobalt or nickel on the zirconium silicate.

Isomerization reactions are carried out under conditions similar to those described above for reforming. Olefins are preferably isomerized at temperatures of 500° F. to 900° F. (260° to 482° C.), while paraffins, naphthenes and alkyl aromatics are isomerized at temperatures of 700° F. to 1000° F. (371° to 538° C.)

The zirconium silicate materials of this invention may have dispersed thereon catalytic metals well known in the art and may be prepared according to the procedure in U.S. Pat. No. 4,422,959 which is incorporated herein by reference. Specifically, one or more metal selected from the group consisting of metals of Group VIII, Group VII-B (especially Re), Group VI-B and mixtures thereof of the periodic table as shown on the inside cover of the Merck Index, 11th Edition, (1989) published by Merck & Co., Rahway, N.J., U.S.A. Since the zirconium silicate has cation exchange capacity, it is preferred to disperse the metals on the zirconium silicate by ion exchange methods well known in the art. The zirconium silicate materials may also be combined with zeolites, clays, etc. in order to prepare a hydrogen conversion catalyst.

It should be pointed out that for certain catalytic reactions it may be desirable to remove the alkali metal cation and replace it with a hydronium ion. This can be accomplished by exchanging the sodium cation with ammonium cation by means well known in the art then calcining the ammonium exchanged zirconium silicate to a temperature from about 300° C. to about 600° C. to give the hydronium form of the composition. When catalytic metals are dispersed on the zirconium silicate compositions it is especially desirable to have the zirconium silicate in the hydronium form.

The structure of the zirconium silicate compositions of this invention was determined by X-ray analysis. The X-ray patterns were obtained using standard X-ray powder diffraction techniques. The radiation source was a high-intensity, copper target, X-ray tube operated at 50 Kv and 40 ma. The diffraction pattern from the copper K-alpha radiation and graphite monochromator was suitably recorded by an X-ray spectrometer scintillation counter, pulse height analyzer and strip chart recorder. Flat compressed powder samples were scanned at 2° (2Θ) per minute, using a two second time constant. Interplanar spacings (d) in Angstrom units were obtained from the position of the diffraction peaks expressed as 2Θ where Θ is the Bragg angle as observed on the strip chart. Intensities were determined from the heights of diffraction peaks after subtracting background, "$I_o$" being the intensity of the strongest line or peak, and "I" being the intensity of each of the other peaks.

Alternatively, the X-ray patterns were obtained from the copper K-alpha radiation by use of computer based techniques using a Siemens D-500 X-ray powder diffractometer, Siemens Type K-805 X-ray sources, available from Siemens Corporation, Cherry Hill, N.J., with appropriate computer interface.

As will be understood by those skilled in the art the determination of the parameter 2Θ is subject to both human and mechanical error, which in combination can impose an uncertainty of about ±0.4° on each reported value of 2Θ. This uncertainty is, of course, also manifested in the reported values of the d-spacings, which are calculated from the 2Θ values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m, and w which represent very strong, strong, medium, and weak, respectively. In terms of $100 \times I/I_o$, the above designations are defined as w=0–15; m=15–60; s=60–80 and vs=80–100.

The following examples are presented in illustration of this invention and are not intended as undue limitations on the generally broad scope of the invention as set out in the appended claims.

EXAMPLE 1

To a container containing 50.4 g of n-propyl alcohol there were added 20.0 g of colloidal silica obtained from DuPont Corp. and identified as Ludox TM HS-40.

Zirconium isopropoxide (31.2 g of 70% in propanol) was separately diluted with n-propanol (3.2 g) and then added dropwise to the stirred slurry of silica in propanol. The resulting cream colored slurry was homogenized, diluted with deionized water and centrifuged twice with additional water to remove the propanol. The solids were diluted to a total weight of 115 g with deionized water and then aged at room temperature for a minimum of 24 hours. Sodium hydroxide (142 cc of 1.0M) was added to the aged slurry. The resulting, high pH slurry was hydrothermally crystallized for 24 hours at 200° C. The solids were recovered by filtration, washed with deionized water and dried at 100° C. The x-ray diffraction pattern exhibits the lines listed in Table B.

TABLE B

| d (Å) | Relative Intensity |
|---|---|
| 11.7 | VS |
| 7.5 | W |
| 4.12 | W |
| 3.69 | M |
| 3.16 | M |
| 2.96 | S |
| 2.79 | W |
| 2.75 | W |
| 2.55 | M |
| 2.40 | W |
| 2.25 | M |
| 2.08 | M |
| 2.05 | W |
| 1.97 | W |
| 1.84 | M |
| 1.75 | W |
| 1.57 | W |
| 1.53 | M |
| 1.52 | W |
| 1.46 | W |
| 1.42 | W |
| 1.34 | W |
| 1.26 | W |
| 1.20 | W |
| 1.18 | W |

This sample was very well crystallized. The crystal structure is stable to temperatures >800° C. This sample was found to contain 59.5% Zr, 5.57% Si and 6.49% Na, which gives a formula of $Na_{2.8}Si_{2.0}Zr_{6.5}O_{17.8}$. It should be pointed out that this formula (and those in Table C) is not stoichiometric. The reason for this is that hydrogen was not analyzed for and the oxygen number was obtained by difference. Scanning Electron Microscopy Analysis show a leaf-like morphology with the largest crystals approximately 1 μ in diameter and about 0.1 μ thick. The surface area of this sample was found to be 108 m²/g, as determined by the BET $N_2$ adsorption method. The lower surface area measured for this more crystalline sample is consistent with a layered structure for this material.

EXAMPLE 2

The procedure outlined in Example 1 was used to prepare several samples having the x-ray diffraction pattern containing the lines listed in Table B above. These compositions are represented by the formula $M_xSi_yZr_zO_w$ where M is sodium or potassium. The values of x, y, z and w are presented in Table C.

TABLE C

| Zirconium Silicate Compositions | | | |
|---|---|---|---|
| M(x) | y | z | w |
| Na(4.3) | 3.8 | 5.1 | 20.5 |
| K (2.9) | 3.3 | 5.1 | 20.3 |
| K (2.0) | 2.7 | 5.6 | 21.1 |
| Na(3.2) | 4.1 | 5.2 | 20.7 |
| Na(2.7) | 2.9 | 5.1 | 24.6 |
| K (1.8) | 2.8 | 5.6 | 21.3 |
| Na(1.3) | 2.1 | 5.9 | 23.2 |

I claim as my invention:

1. A composition of matter having the formula $$M_xSi_yZr_zO_w$$

where M is an ammonium ion, a hydronium ion, an alkali metal or mixtures thereof, x is the moles of M and varies from about 1 to about 5, y is the moles of silicon and varies from about 2 to about 5, z is the moles of zirconium and varies from about 4 to about 6 and w is the moles of oxygen and varies from about 17 to about 25 said composition having a characteristic x-ray powder diffraction pattern which contains at least the d-spacings and relative intensities set forth in Table A:

TABLE A

| d (Å) | Relative Intensity |
|---|---|
| 11.7 | VS |
| 4.12 | W |
| 3.69 | M |
| 3.16 | M |
| 2.96 | S |
| 2.75 | W |
| 2.25 | M |
| 2.05 | W |
| 1.84 | M |
| 1.57 | W |
| 1.53 | M. |

2. The composition of claim 1 where M is an alkali metal selected from the group consisting of sodium, potassium, cesium, lithium and mixtures thereof.

3. The composition of claim 2 where M is sodium.

4. The composition of claim 2 where M is potassium.

5. The composition of claim 1 further characterized in that said composition has a surface area of about 80 to about 400 m²/g.

6. The composition of claim 1 further characterized in that said composition has dispersed thereon at least one metal selected from the group consisting of the Group VIII metals, Re, and mixtures thereof.

7. A process for preparing a composition having the formula $$M_xSi_yZr_zO_w$$

where M is at least one alkali metal, x is the moles of M and varies from about 1 to about 5, y is the moles of silicon and varies from about 2 to about 5, z is the moles of zirconium and varies from about 4 to about 6 and w is the moles of oxygen and varies from about 17 to about 25 said composition having a characteristic x-ray powder diffraction pattern which contains at least the d-spacings and relative intensities set forth in Table A:

TABLE A

| d (Å) | Relative Intensity |
|---|---|
| 11.7 | VS |
| 4.12 | W |
| 3.69 | M |
| 3.16 | M |
| 2.96 | S |
| 2.75 | W |
| 2.25 | M |
| 2.05 | W |
| 1.84 | M |
| 1.57 | W |
| 1.53 | M | the process consisting essentially of reacting at reaction conditions a mixture containing reactive sources of zirconium, silicon and M to form said composition, the mixture having a composition expressed in terms of mole ratios of oxides:

$$rM_2O:ZrO_2:tSiO_2:uH_2$$

where r ranges from about 0.8 to about 5, t ranges from about 1 to about 10 and u ranges from about 30 to about 300.

8. The process of claim 7 where the reaction conditions include a pH of 12 or greater, a temperature of about 130° C. to about 300° C. and a time of about 10 hours to about 14 days.

9. The process of claim 7 where the zirconium source is selected from the group consisting of a zirconium alkoxide, zirconium hydroxide, and zirconium oxychloride.

10. The process of claim 7 where the silicon source is colloidal silica or sodium silicate.

11. The process of claim 7 where the M metal source is a M metal hydroxide.

12. The process of claim 7 where M is selected from the group consisting of sodium, potassium, cesium,, lithium and mixtures thereof.

* * * * *